United States Patent

[11] 3,593,809

| [72] | Inventor | William Chester Derry<br>Bayard, Iowa 50029 |
| --- | --- | --- |
| [21] | Appl. No. | 791,425 |
| [22] | Filed | Jan. 15, 1969 |
| [45] | Patented | July 20, 1971 |

[54] SOIL SAMPLER DEVICE
13 Claims, 6 Drawing Figs.

[52] U.S. Cl. ............................................. 175/51, 175/113, 175/209
[51] Int. Cl. ............................................. E21b 3/02
[50] Field of Search .................................. 175/51, 113, 84, 207, 209, 88; 173/19, 145, 152; 73/425.1, 421

[56] References Cited
UNITED STATES PATENTS

| 545,569 | 9/1895 | Bliss | 173/19 |
| --- | --- | --- | --- |
| 1,540,682 | 6/1925 | Dreher et al. | 175/51 |
| 1,742,961 | 1/1930 | Lynman | 173/19 X |
| 2,210,628 | 8/1940 | Mantini | 173/145 X |
| 2,416,036 | 2/1947 | Zimmerlein | 173/19 |
| 2,639,892 | 5/1953 | Jones | 173/19 |
| 3,406,765 | 10/1968 | Alexander | 175/51 |
| 3,344,875 | 10/1967 | Briner | 175/88 |

*Primary Examiner*—Marvin A. Champion
*Assistant Examiner*—Richard E. Favreau
*Attorney*—Zarley, McKee & Thomte ABSTRACT: A device having an auger shaft connected to a frame. A motor platform is mounted on the threaded shaft and moves therewith while supporting a finger-shaped soil-sampling receptacle embracing the auger portion of the auger shaft. The soil-sampling receptacle is maintained in yieldable engagement against the ground around the auger shaft and receives the soil sample which moves through a sleeve extending through the space between the finger-shaped receptacle whereupon the soil sample empties downwardly into the receptacle. Limit switches are provided to stop the operation of the unit at predetermined points in its upward and downward travel. The soil-sampling unit is adjustably mounted on the side of a pickup truck and is powered by the truck battery.

PATENTED JUL 20 1971 3,593,809

INVENTOR
WILLIAM C. DERRY
BY
Zarley, McKee & Thomte
ATTORNEYS

SOIL SAMPLER DEVICE

The sampling of soil is normally done manually by use of a hand operated device which is carried by the operator from point to point throughout the area of soil being tested. The labor requirements and time consumed are great using the manual method. Furthermore, the uniformity in the sampling is not guaranteed.

The soil-sampling unit of this invention permits rapid taking of soil samples by driving a vehicle between the soil sample points. The mechanism upon being operated automatically lowers itself a predetermined distance and discharges a soil sample into a receptacle. The soil-sampling unit may be quickly attached and removed from the bed of a pickup truck and may be adjusted up and down and in and out from the truck. The power is supplied by the electrical system of the truck.

The depth of penetration of the soil-sampling auger is consistent since it is related to the height of the truck off the ground.

These and other features and advantages of this invention will become readily apparent to those skilled in the art upon reference to the following description when taken into consideration with the accompanying drawings, wherein.

Figure 1:
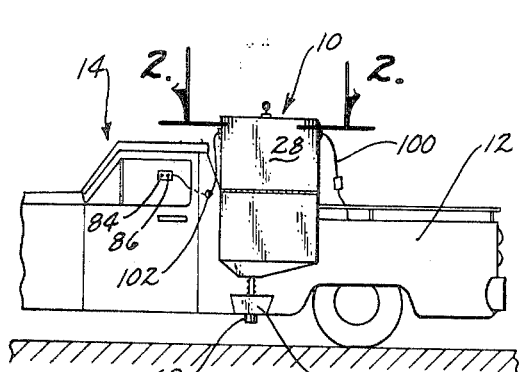
FIG. 1 is a fragmentary side perspective view of the soil sampling device mounted on the side of a pickup truck.
Figure 2:
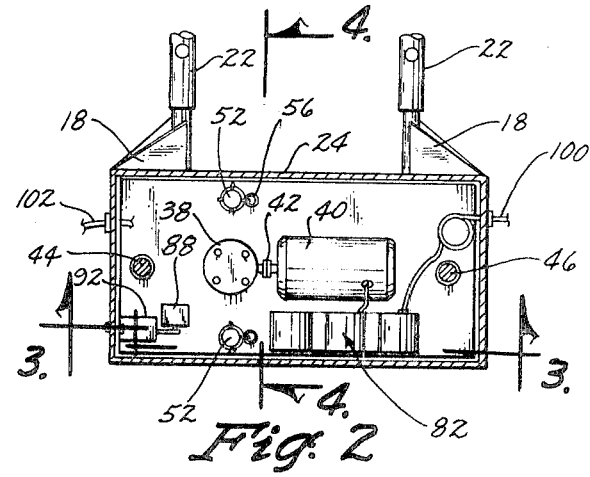
FIG. 2 is a cross-sectional view taken along line 2-2 in Fig. 1.

The soil-sampling device of this invention is referred to generally in Fig. 1 by the reference numeral 10 and is shown mounted on the side 12 of a pickup truck 14. The pickup truck 14 has a bed or floor 16 which cooperates with the sidewall 12 to provide a support base for a pair of upstanding mounting brackets 18 having telescoping members 20 at the top thereof connected to horizontally disposed outwardly extending telescoping members 22 which in turn are rigidly connected to a housing 24 at its back side as seen in Fig. 2.

The housing 24 is secured to a frame 26 and includes a pivotal door 28 which provides access into the inside of the housing 24.

Figure 3:
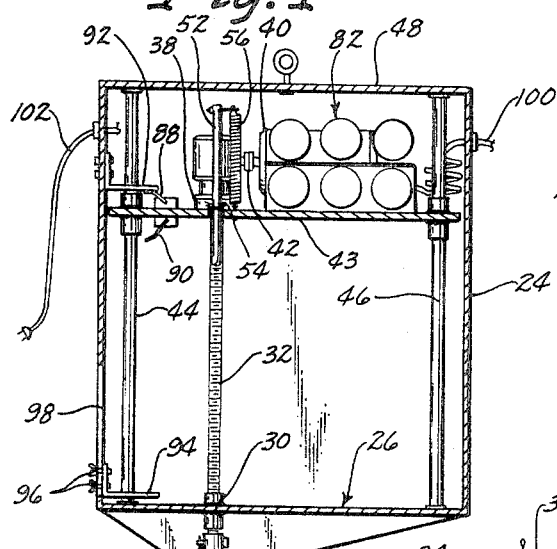
FIG. 3 is a cross-sectional view taken along line 3-3 in Fig. 2.
Figure 5:
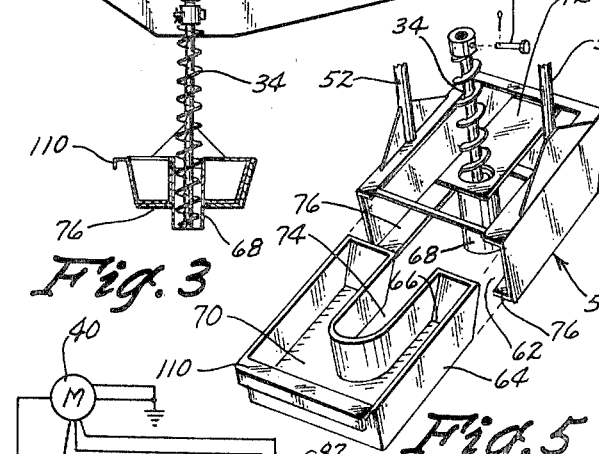
FIG. 5 is an exploded perspective view of the soil-sampling receptacle and support structure in conjunction with the soil-sampling auger.

The frame 26 as seen in Fig. 3 is provided with a threaded sleeve 30 through which a threaded elongated upstanding shaft 32 extends. The lower end of the shaft 32 is connected to a removable auger portion 34. A pin 36 as seen in Fig. 5 connects the auger portion 34 to the threaded shaft 32.

The threaded shaft 32 terminates at its upper end at a gearbox 38 connected to a motor 40 through a shaft 42. The gearbox 38 and the motor 40 are carried on a movable platform 43 slidable on guide posts 44 and 46 extending between the top 48 of the housing and the frame member 26 at the bottom.

The platform 43 in turn carries a receptacle support shoe 50 through a pair of downwardly extending rods 52 which extend from above the platform 43 down through the frame 26 to rigid engagement with the receptacle support 50. A cotter pin 54 extending through each of the rods 44 limits the downward travel of the receptacle support 50 and upward travel of the receptacle support 50 relative to the platform 43 is limited by a spring 56 extending between the tops of the rods 52 and the platform 43. Conversely, as the platform 43 moves downwardly and the receptacle support 50 engages the ground 60 the platform 43 will continue against the action of the springs 56 and thus maintain the receptacle support 50 in yieldable contact with the ground 60.

The receptacle support 50 is opened at one end 62 and receives receptacle 64 having finger portions 66 for extending on opposite sides of an auger sleeve 68 embracing the auger 34 which extends downwardly through the center of the receptacle support 50. The soil sample receptacle 54 is square at its outer end and includes a main storage chamber 70 providing the finger receptacle portion 66 in continuous communication with each other around the auger portion 34 in the sleeve 68. A cover plate 72 extends over the space 74 between the finger receptacle portions 66 so that dirt augered up through the sleeve 68 will fall into the receptacle portions 66 or 70 and not back onto the ground through the space 74. Dirt falling onto the cover plate 72 may be brushed into the soil sampling receptacle 64.

It is seen in Fig. 3 that the auger sleeve 68 extends below the bottom wall flange 76 such that a seal is provided around the auger portion 34 thereby insuring that the soil sample is cleanly augered up and downwardly into the soil receptacle 64.

The opposite end walls of the receptacle finger portions and the portions 70 are inclined upwardly and outwardly as seen in Fig. 3.

Figure 6:
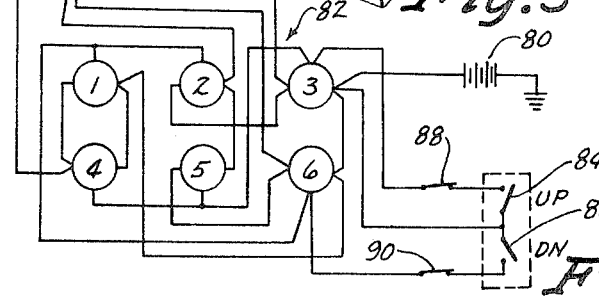
FIG. 6 is an electrical schematic.

The electrical circuitry is illustrated in Fig. 6 and includes the motor 40 powered by a battery 80 through a series of six solenoids 82 and up and down switches 84 and 86 respectively. Additionally, up and down limit switches 88 and 90 are provided and are shown in Fig. 3 carried on the platform 43 whereby the up limit switch 80 is adapted to engage the stop element 92 when the platform is moving upwardly and the down limit switch 90 is adapted to engage the vertically adjustable stop element 94 when the platform is moving downwardly. The thumb nuts 96 may be adjusted to move the stop element 94 in a slot 98 formed in the housing side wall adjacent the cab door to the truck 14 such that quick adjustment may be made for the depth of operation of the auger in the soil sampling operation. The limit switches 88 and 90 are normally closed and are opened upon their engaging their respective stops 92 and 94. Thus it is seen that by depressing the button 84 for moving the unit upwardly it will continue to move until the limit switch 88 has been actuated by the up stop 92. The unit is then shut down and will move downwardly upon the down switch 86 being closed. It will travel downwardly until the limit switch 90 is opened by engagement with the stop 94. The operation may then be reversed.

Figure 4:
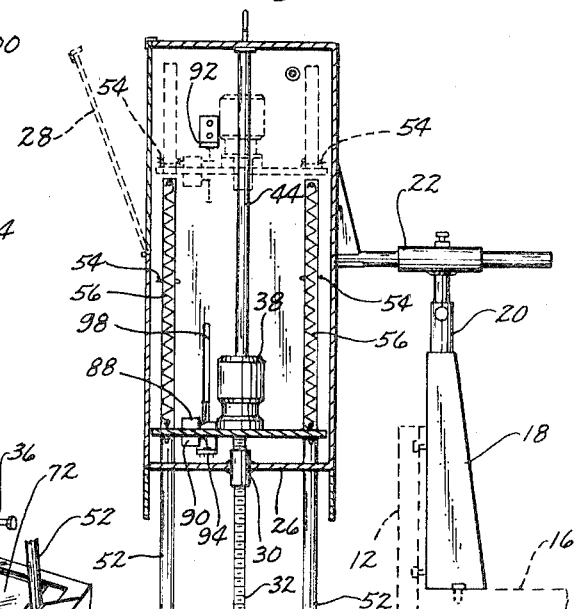
FIG. 4 is a cross-sectional view taken along line 4-4 in Fig. 2.

The unit may be positioned upwardly from the vehicle as seen in Fig. 4 by adjustment of the thumbscrew in the telescopic connection 22 while the unit may be raised and lowered by adjustment of the telescopic connection 20. The three bolts in each of the mounting brackets 18 may be removed to remove the entire unit from the truck while the power line and switch line cords 100 and 102 respectively may be readily connected and disconnected by operation of the quick release coupler in these respective lines. It is seen that the up and down switches 84 and 86 are located within the cab of the truck 14 for convenient operation.

The driver of the truck sitting in the cab has direct line of sight to the soil receptacle 64 and thus may operate the entire unit alone. Individual soil samples may be taken or samples of soil from different spots may be combined and mixed together in the receptacle 64. In any event, the receptacle 64 may be readily pulled out of the receptacle support 50 by use of the handle 110 on the end of the receptacle 64.

It is seen that when the unit is being lowered the receptacle support 50 and the receptacle 64 will move as a unit with the platform 43 and the auger portion 34 until the lower side of the receptacle support 50 engages the ground whereupon the platform 43 will continue downwardly against the action of the springs 56 which will then tend to put pressure on the receptacle support 50 to force the sleeve 68 into the ground and thus provide a tight seal around the auger portion 34 whereby all soil augered upwardly is deposited in the receptacle 64.

Variations in the structure may be made as desired within the scope of this invention. For example, the power supply for operating the unit may be hydraulic if desired. The rate of penetration of the auger can be varied by the choice of the particular auger used and the threads per inch will dictate the rate of penetration of the auger into the ground. Furthermore, the gearing arrangement and motor used will affect the speed of operation and rate of penetration. The rate of penetration is particularly important when taking soil samples from frozen ground.

I claim:

1. A device for sampling soil, comprising, a frame, a soil-sampling tool carried on a shaft threadably connected to said frame for moving said tool upwardly and downwardly relative to the ground, power means for rotating said shaft, a soil-sampling receptacle having a top access opening associated with said tool for receiving said sample, said tool extending vertically closely adjacent said receptacle and retaining means provided around said tool to hold a soil sample on said tool until the soil sample has moved upwardly to a point of communication with the access opening in said receptacle whereupon said soil sample is emptied into said receptacle through said access opening, and said receptacle is positioned in a support enclosure including said retaining means, said support enclosure being movably disposed longitudinally of said soil-sampling tool for maintaining engagement with the ground when said tool is in engagement with the ground.

2. The structure of claim 1 wherein said frame is carried on a mobile vehicle.

3. The structure of claim 1 wherein said tool is an auger and said retaining means is a sleeve.

4. The structure of claim 1 wherein said actuating means are associated with said shaft and limit switches are operatively connected to said power means and engageable by said actuating means at the end of predetermined distances of travel of said tool up and down respectively, and means associated with said power means and said limit switches for deactivating said power means upon one of said limit switches being actuated by said actuating means.

5. The structure of claim 1 wherein said frame is vertically stationary whereby said soil-sampling tool is moveable upwardly and downwardly relative thereto at times.

6. The structure of claim 1 wherein said receptacle is removably positioned in said support enclosure.

7. The structure of claim 1 wherein when said support enclosure is in engagement with the ground said retaining means maintains a seal around said tool and with the ground for preventing said soil sample from spilling onto the ground.

8. The structure of claim 1 wherein said shaft operatively supports said support enclosure and is movable therewith upon said shaft moving a predetermined distance upwardly, said support enclosure normally being biased downwardly by gravity for engagement with the ground.

9. The structure of claim 8 wherein a spring means assists gravity in normally biasing downwardly said support enclosure towards the ground.

10. The structure of claim 1 wherein said receptacle includes finger receptacle portions defining a space therebetween adapted to receive said tool and said retaining means, said retaining means being carried on said support enclosure, whereby said receptacle may be moved into and out of embracing engagement with said tool and retaining means.

11. The structure of claim 10 wherein said finger receptacle portions are interconnected at one pair of adjacent ends to provide a continuous compartment including said finger compartments around the substantial periphery of said tool.

12. The structure of claim 11 wherein said tool is an auger and said retaining means is a sleeve.

13. The structure of claim 1 wherein said frame includes an upstanding guide shaft and a movable platform is carried on the upper end of said auger tool shaft and said power means is carried by said platform, and said support enclosure is supported by said tool shaft by a support shaft extending upwardly from said support enclosure and terminating above said platform, a spring means extends between the upper end of said support shaft and said platform to yieldably urge said support enclosure downwardly into engagement with the ground upon said tool shaft having moved a predetermined distance downwardly.